April 28, 1970     T. FRENCH     3,508,594
TIRES
Filed Aug. 24, 1967     2 Sheets-Sheet 1
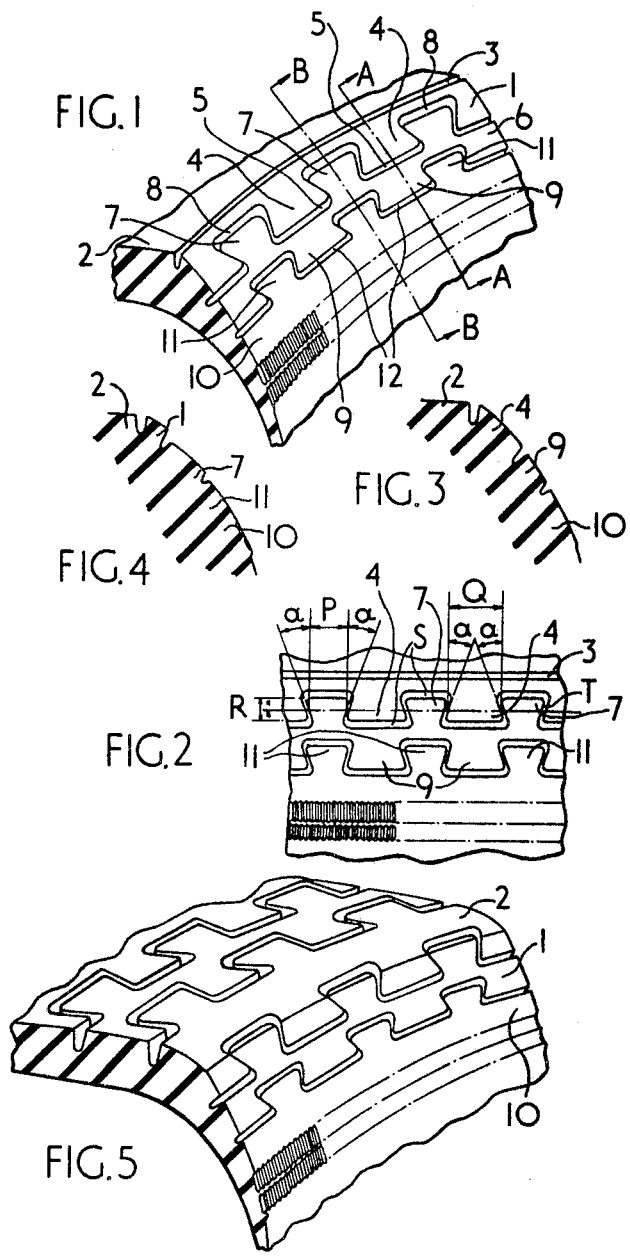
Tom French
INVENTOR
By Rauber & Lazar
HIS ATTORNEYS

United States Patent Office 3,508,594
Patented Apr. 28, 1970

3,508,594
TIRES
Tom French, Sutton Coldfield, England, assignor to The Dunlop Company Limited, London, England, a British company
Filed Aug. 24, 1967, Ser. No. 663,123
Claims priority, application Great Britain, Aug. 26, 1966, 38,312/66
Int. Cl. B60c *13/00, 11/00*
U.S. Cl. 152—209
10 Claims

ABSTRACT OF THE DISCLOSURE

A pneumatic tire shoulder provided with interengaging blocks, ribs or the like shaped and disposed so that on application of a local distorting force e.g. on cornering the blocks etc. interlock with each other to resist the force. Similar blocks etc. may also be provided on the tread and/or sidewalls, and the blocks etc. of the shoulder region may or may not interengage with these.

---

This invention relates to pneumatic tires.

Difficulty has been experienced, when pneumatic tires mounted on the steerable wheels of a vehicle, are driven at a slightly inclined angle towards, for example, raised white marker lines applied to a road surface or the junction of areas of concrete forming a road surface, so that the tire will ride over them. When the shoulder of the tire engages with either the raised white lines or the junction between the concrete areas, there is a tendency for the tire shoulder, as it engages the raised portion to deflect the tire from its steered course so that the tire will not, without steering correction, roll over and past the raised portion.

It has been proposed to provide a stepped-shoulder portion in which a rib or the like, in an axially-outermost position of the shoulder, is stepped down, in the radially-inward sense from the remainder of the tread, this graduation of profile causing the tire to ride, first by means of the shoulder, over raised edges substantially without resistance.

The difficulty, however, with this arrangement is that, after a considerable length of tire useage, accumulated wear on the tread is greater than that on the shoulder and the shoulder step eventually disappears.

In some designs of stepped-shoulder tires the shoulder portion is lacking in rigidity compared with the rigidity of the tread portion so that the steering force developed when the tire is supported on the tread and shoulder portions is reduced, when compared with support only from the tread portion, due to the reduced shoulder rigidity, and it is an object of the present invention to provide an improved tire of the kind described with increased shoulder rigidity.

It is also an object of the invention to provide a tire with increased tread rigidity combined with the increased shoulder rigidity.

According to the invention a pneumatic tire comprises a tread portion, a shoulder portion and a sidewall portion, said shoulder portion having a ground-contacting surface made up of elements which interengage with themselves or with corresponding elements in either or both of said other portions, the elements having a shape and being disposed relative to one another such that upon the application of a force in a direction transverse to a circumferential plane of the tire, the tire is locally displaced in and adjacent to the contact area and some at least of the elements in the displaced region interlock with one another to form a local region of increased resistance to said force.

The elements in the tread, shoulder and sidewall portions may each comprise blocks, ribs or the like, and may be of any suitable shape, falling within the scope of the invention.

When such a tire is subjected to a transverse force the shoulder and/or sidewall portion elements interlock but they do not come into operation with straight-line braking or accelerating forces applied to the tire; in this instance the interengaging tread portion elements, if provided, are operative to form a local region of interlocked elements which offers increased resistance to the said forces.

Two embodiments of the invention will now be described by way of example each comprising a pneumatic car tire having the shoulder portion extending approximately ⅙ of the way down the side of the tire, measured from the tread edge to the bead base along the curvature of the sidewall, and comprising two generally circumferential ribs. The embodiments are illustrated in the accompanying drawings of which;

FIGURE 1 shows a three-quarter sectional view of part of a tire according to the first embodiment of the invention;

FIGURE 2 shows a plan view of part of the tire shown in FIGURE 1;

FIGURE 3 is a section along the line A—A of FIGURE 1;

FIGURE 4 is a section along the line B—B of FIGURE 1;

FIGURE 5 shows a three-quarter sectional view of part of a tire according to a modification of the first embodiment;

Figure 6:
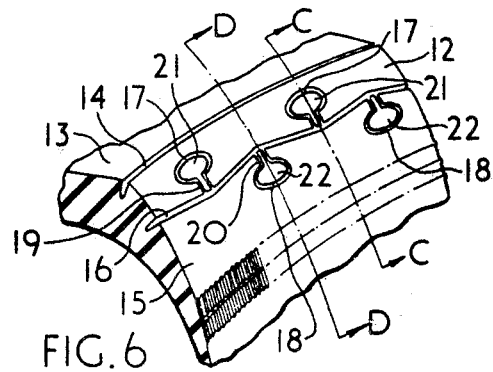
FIGURE 6 shows a three-quarter sectional view of part of a tire according to the second embodiment of the invention.

In the tire of the first embodiment shown in FIGURES 1 to 4 the shoulder rib 1 is separated from the tread 2 by a plain narrow circumferential groove 3. This first rib is provided with a plurality of circumferentially spaced-apart dove-tail-shaped projections 4 extending radially inwardly towards the bead portion of the tire (not shown), these projections interengagig with correspondingly-shaped recesses 5 provided on the radially outward side of the second generally circumferential shoulder rib 6. The projections and recesses are closely fitting for the reason and in the manner which will be described later and the second rib has dove-tail-shaped projections 7 extending radially outwardly into the recesses 8 between the radially-inwardly-formed projections of the first rib. Thus the association between the first and second ribs is that of a series of mutually interengaging dove-tail-shaped projections and recesses, closely fitting as regards the tapering faces of the dove-tail portions and projections, a greater clearance being provided between the ends of the dove-tail portions and the ends of the recesses.

The second generally circumferential rib 6 is provided with, in addition to the radially-outwardly-extending dove-tail portions 7, radially-inwardly-projecting dove-tail portions 9, the rubber of the sidewalls 10 being provided, itself, with dove-tail-shaped portions 11 and recesses 12 so that there is an interengagement between the second rib 6 and the sidewall 10 in the same way as that between the first and second ribs. In the case of the radially-outwardly-extending dove-tail-shaped portions formed on the second rib and the sidewall the outwardly-facing surface of each of these portions does not lie in the plane of the surface of the shoulder and sidewall but is disposed at a level below that of the surrounding rubber i.e. it is stepped-down. (See FIGURE 4.)

The dimensions of the various parts of the shoulder of the tire of the first embodiment are substantially as listed below, the reference letters being those shown in FIGURE 2.

| | |
|---|---|
| Dimension P | ½″ |
| Dimension Q | ¾″ |
| Dimension R | ⅜″ |
| Dimension S | 0.08″ |
| Dimension T | 0.04″ |
| Angle a | 35° |
| Width of groove 3 | 0.1″ |

The operation of the shoulder construction of the first embodiment just described is as follows:

When the tire rolls sideways e.g. when a sideways cornering force is applied to it, the tension applied to the external surface of the rubber of the shoulder and tread portions as it increases in curvature and comes into contact with the ground, moves the dove-tail-shaped portions and their corresponding closely fitting recesses relatively one-to-another so that the dove-tail-shaped portions, as regards their tapering faces come into abutting contact i.e. interlock with the adjacent walls of the recesses, further displacement of the rubber then being comparatively greatly restricted with consequent advantage in respect of reduced tread wear.

A very considerable advantage of the tire according to the invention is that, due to the stiffening up of the shoulder of the tire when the dove-tail portions and corresponding recesses interlock, a very positive steering force is obtainable which is considerably improved compared with tires where this interlocking does not take place during tire operation.

In addition, due to the fact that the outwardly-facing surfaces of the radially-outwardly-extending dove-tail portions of the ribs and the sidewalls are below the level of the surrounding rubber a stepped-down effect is obtained and thus the tire is effective in steering over, for example, raised white marker lines and the junction of areas of concrete forming a road surface, without substantial interference to the steering of the tire and thus the vehicle.

In a modification of the first embodiment shown in FIGURE 5, interengaging dove-tail portions are provided on the tread, some of which interengage with themselves while others interengage with dove-tail portions of the shoulder portion. The dimensions of the grooves and the portions in the modification are similar to those in the embodiment. In further modifications of the first embodiment the spacing between the tapered surfaces of the dove-tail portions and the adjacent recesses may be between 0.005 inch and 0.050 inch and while two circumferential ribs have been described in the specific embodiment any suitable number may be provided. The width of the circumferential groove 3 may be from 0.08 inch to 0.12 inch. The angle of taper a of either of the tapered faces of each of the dove-tail portions may be between 20 and 50° with respect to a longitudinal line extending down the portions between tapered faces and the corners of the dove-tail portions may be radiused. The ranges of dimensions which are considered to be useful in motor car tire designs in respect of the proportions of the dove-tail portions are: length of the dove-tail portions R: ¼ to ¾ of an inch; width of the dove-tail portions P: ⅜ to 1 inch; width of the dove-tail recesses Q: ¼ to 1½ inches. The depth of shoulder treatment while described as extending for ⅙ of the depth of the tire may extend less or more than this amount e.g. for ⅓ of the said depth.

In the tire of the second embodiment shown in FIGURES 6 to 9 the rib 12 is separated from the tread 13 by a narrow circumferential groove 14 and from the sidewall 15 by a generally circumferential zig-zag groove 16.

The rib 12 and the radially outermost part of the sidewall 15 are each provided with circumferentially spaced-apart oval recesses 17 and 18 respectively, the larger axis of each recess extending in the circumferential direction of the tire. The recesses are equally spaced in the rib and in the sidewall, but each recess in the rib is halfway between two adjacent recesses in the sidewall. The recesses are all connected to an apex in the zig-zag groove 16 by radially-extending grooves 19 and 20, those in the rib 12 extending radially-outwardly from the groove 16 and those in the sidewall 15 extending radially inwardly from the groove 16.

Located in and interengaging with each of the recesses 17 and 18 and the grooves 19 and 20 are approximately "key-hole"-shaped blocks 21 and 22, the outer shape of each of which corresponds to shape of each recess and groove combination and the outer dimensions of each being slightly less than its corresponding combination. In the case of the radially-outward extremities of the blocks located radially-outwardly of the groove 16 the outwardly facing surface of each of these extremities does not lie in the plane of the surface of the shoulder and sidewall but is disposed at a level below that of the surrounding rubber i.e. it is stepped-down (see FIGURE 8. The surface of each radially-inward extremity of each of the blocks located radially-inwardly of said groove 16 is also similarly stepped-down (see FIGURE 9).

Figure 7:
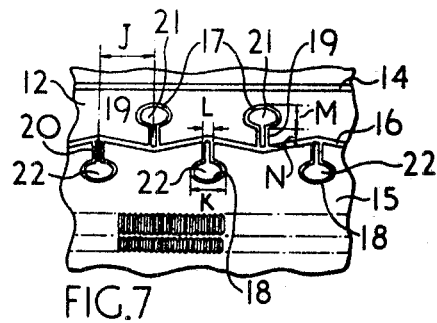
FIGURE 7 shows a plan view of part of the tire shown in FIGURE 6.
Figures 8, 9:
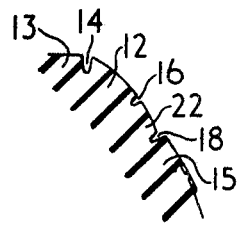
FIGURE 8 is a section along the line C—C of FIGURE 6.
FIGURE 9 is a section along the line D—D of FIGURE 6.

The dimensions of the various parts of the shoulder of the tire of the second embodiment are substantially as listed below, the reference letters and numbers being those shown in FIGURE 7:

| | Inches |
|---|---|
| Zig-zag groove 16 | 0.08 |
| Circumferential groove 14 | 0.1 |
| Groove bounding key-hole-shaped blocks 21 and 22 | 0.04 |
| Dimension J | ¾ |
| Dimension K | ½ |
| Dimension L | ⅛ |
| Dimension M | ¼ |
| Dimension N | ¼ |

The operation of the shoulder construction of the second embodiment just described is similar to that of the operation of the first embodiment, the application of a generally sideways force causing the key-hole-shaped blocks to interlock in their correspondingly closely fitting recesses, so that a tire with the shoulder construction has similar advantages to those of the tire of the first embodiment.

In modifications of the second embodiment the spacings between the blocks and the edges of their corresponding recesses may be between 0.005 inch and 0.050 inch and while one circumferential rib between the sidewall and the tread has been described in the specific embodiment any suitable number may be provided. The width of the groove 14 may be from 0.08 inch to 0.12 inch and of groove 16 from 0.04 inch to 0.1 inch. The ranges of dimensions which are considered to be useful in motor car tire designs, referring again to FIGURE 7 are:

| | Inches |
|---|---|
| Dimension J | ½–1½ |
| Dimension K | ¼–¾ |
| Dimension L | 1/16–¼ |
| Dimension M | ⅛–⅜ |
| Dimension N | ⅛–⅜ |

The depth of the shoulder while described as extending for ⅙ of the depth of the tire may extend less or more than this amount e.g. for ⅓ of the said depth.

It will be appreciated that any other interengaging and interlocking shapes apart from those described herein, can be utilised providing that, functionally, the result described in the specification is obtained. For example, the oval part of the "key-hole"-shaped block and its corresponding recess may be replaced by a circular, triangular, quadrangular or polygonal part interengaging and interlocking with a similarly-shaped recess.

Having now described my invention, what I claim is:

1. A pneumatic tire comprising a tread portion, a shoulder portion and a sidewall portion, said shoulder portion having a ground-contacting surface made up of inter-engaging elements, the inter-engagement of the elements being by reason of the location of at least a portion of one element in a recess in a further element the shape of the portion of the one element being complementary with the shape of the recess whereby upon the application of force in a direction transverse to a circumferential plane of the tire the tire is locally displaced in and adjacent to the contact area and at least some of the elements in the displaced region interlock with one another to form a local region of increased resistance to said force.

2. A pneumatic tire according to claim 1 wherein said sidewall portion has a surface made up of said elements interengaging with corresponding elements of the shoulder portions.

3. A pneumatic tire according to claim 1 wherein said shoulder portion has a surface made up of elements interengaging with corresponding elements of the tread portion.

4. A pneumatic tire according to claim 1 wherein the said tread portion has a ground-contacting surface made up of interengaging elements the elements having a shape and being disposed relative to one another such that, upon the application of a braking or accelerating force to the tire, the tire is locally displaced in and adjacent to the contact area and at least some of the elements in the displaced region interlock with one another to form a local region of increased resistance to said force.

5. A pneumatic tire according to claim 4 wherein at least some of the elements of the shoulder portion interengage with at least some of the elements of the tread portion.

6. A pneumatic tire according to claim 1 wherein at least some of the elements each comprises a block.

7. A pneumatic tire according to claim 1 wherein at least some of the elements each comprises a rib.

8. A pneumatic tire according to claim 1 wherein the interengaging elements are "dovetail" in shape.

9. A pneumatic tire according to claim 1 wherein the interengaging elements are "key-hole"-shaped each of said elements interengaging with a corresponding shaped recess in at least one rib of the tire.

10. A pneumatic tire according to claim 1 wherein the shoulder region extends between 0 and ⅓ of the distance from the tread edge towards the bead region measured on the curved sidewall.

References Cited

UNITED STATES PATENTS

| | | | |
|---|---|---|---|
| D. 56,766 | 12/1920 | Rector | 152—353 X |
| 2,690,202 | 9/1954 | Walsh | 152—209 |
| 3,115,919 | 12/1963 | Roberts | 152—209 |
| 3,155,135 | 11/1964 | Klenk | 152—353 |
| 3,024,825 | 3/1962 | Kutsmichel | 152—209 |

ARTHUR L. LA POINT, Primary Examiner